US011368725B1

(12) United States Patent
Vlassopulos et al.

(10) Patent No.: US 11,368,725 B1
(45) Date of Patent: Jun. 21, 2022

(54) SYSTEM AND METHOD FOR CREATING A VIRTUAL JOURNEY EXPERIENCE

(71) Applicant: Daedalus Development, Inc., Davie, FL (US)

(72) Inventors: Christopher Vlassopulos, Davie, FL (US); Kelly Ignatoff, Davie, FL (US)

( * ) Notice: Subject to any disclaimer, the term of this patent is extended or adjusted under 35 U.S.C. 154(b) by 0 days.

(21) Appl. No.: 17/123,333

(22) Filed: Dec. 16, 2020

(51) Int. Cl.
*H04N 21/214* (2011.01)
*H04N 21/242* (2011.01)
*H04N 21/218* (2011.01)

(52) U.S. Cl.
CPC ... *H04N 21/2146* (2013.01); *H04N 21/21805* (2013.01); *H04N 21/242* (2013.01)

(58) Field of Classification Search
CPC ......... H04N 21/2146; H04N 21/21805; H04N 21/242
See application file for complete search history.

(56) References Cited

U.S. PATENT DOCUMENTS

| 4,873,585 | A | 10/1989 | Blanton et al. |
| 5,669,773 | A | 9/1997 | Gluck |
| 6,113,500 | A | 9/2000 | Francis et al. |
| 2008/0188318 | A1 | 8/2008 | Piccionelli et al. |
| 2017/0280124 | A1* | 9/2017 | Ahlborn ............. G06K 9/00832 |
| 2018/0068170 | A1* | 3/2018 | Kohlmeier-Beckmann ................. G06K 9/00288 |
| 2019/0258880 | A1* | 8/2019 | Brauer ............... H04N 5/23296 |

* cited by examiner

*Primary Examiner* — Yassin Alata
(74) *Attorney, Agent, or Firm* — Weide & Miller, Ltd.

(57) ABSTRACT

A system for creating a virtual journey experience comprises an environment having at least a first side and a second side and an interior space therebetween, a first number of video displays located at the first side of the interior space facing into the interior space and spaced apart from one another, a second number of video displays located at the second side of the interior space and facing into the interior space and spaced apart from one another, and a video content presentation system, the video content presentation system configured to cause the first number of video displays to present video content captured by one or more cameras from a first side of a moving object and cause the second number of video displays to present video content captured by one or more cameras from a second side of the object.

16 Claims, 7 Drawing Sheets

SYSTEM AND METHOD FOR CREATING A VIRTUAL JOURNEY EXPERIENCE

FIELD OF THE INVENTION

The present invention relates to a method and system for creating a virtual journey experience.

BACKGROUND OF THE INVENTION

Virtual experiences or simulations are now commonplace and are used for a variety of purposes and in a variety of settings. For example, instead of building a large and expensive mechanical amusement ride such as a rollercoaster, a rollercoaster experience may be simulated, such as via a ride simulator. The ride simulator may comprise a movable ride compartment for simulating motion and have a main display that riders watch, where that main display presents graphical information which simulates what the riders would see if they were on an actual ride. One example of such a simulator is illustrated and described in U.S. Pat. No. 6,113,500.

In other situations, virtual experiences may be used to allow people to experience events or places in a less expensive manner. For example, instead of travelling from the US to Africa to experience wildlife, a person might simply watch a video of an African wildlife safari on their television. In order to improve the sense of realism, such a video may be presented via a 3-D display and/or a wearable headset.

Of course, the "realism" of the virtual experience is important to making the virtual experience satisfying. However, various problems exist when trying to enhance the realism of virtual experiences.

The present invention represents various solutions to the creation of a realistic virtual experience, and particularly the experience of a journey, such as a travel journey or excursion.

SUMMARY OF THE INVENTION

The present invention comprises methods and systems for simulating the experience of a journey or excursion, such as a travel journey by rail, ship, aircraft, motor vehicle or even on foot.

In one embodiment, a system for creating a virtual journey experience comprises a structure having at least a first side and a second side and an interior space therebetween, a plurality of seats located in the interior space, a plurality of video displays located at the first side of the interior space facing into the interior space so as to be viewable from the interior space, the plurality of first video displays spaced apart from one another, a plurality of second video displays located at the second side of the interior space and facing into the interior space to as to be viewable from the interior space, the plurality of second video displays spaced apart from one another, and a video content presentation system, the video content presentation system configured to cause the plurality of first video displays to present video content captured by one or more cameras from a first side of a moving object and cause the plurality of second video displays to present video content captured by one or more cameras from a second side of the object.

In one embodiment of a method, video content is captured by one or more cameras from generally opposing sides of a moving object (mode of transport, moving person, etc.). A video content presentation system is used to present the video content captured at one side of the moving object via spaced-apart first video displays at a first side of a viewing environment and is used to present the video content captured at the other side of the moving object via spaced-apart second video displays at a second side of the viewing environment.

In one embodiment, the viewing environment or structure may comprise a restaurant or dining area, lounge or the like which modified to include the video content presentation system, including the video displays.

The video content may comprise video of a railway journey captured from a real moving train, a cruise on an actual ship, a flight via an aircraft, a walking tour of a museum, castle or the like, or other excursions or journeys.

The viewing environment may be themed in accordance with the virtual journey, such as by including ornamentation or features consistent with the journey, including with ornamentation relating to a railcar for a rail journey or an airplane for a simulated flight. In the case of a dining experience, food which relates to the theme, location or the like of the journey may be served.

In one embodiment, the video which is displayed by the video displays is time offset based at least in part upon the distance between the displays in the viewing environment.

In one embodiment, audio is captured in association with the video and audio is presented via the system.

Further objects, features, and advantages of the present invention over the prior art will become apparent from the detailed description of the drawings which follows, when considered with the attached figures.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

One embodiment of the invention is a method and system for presenting a virtual journey experience.

Virtual Experience Environment

Figure 1:
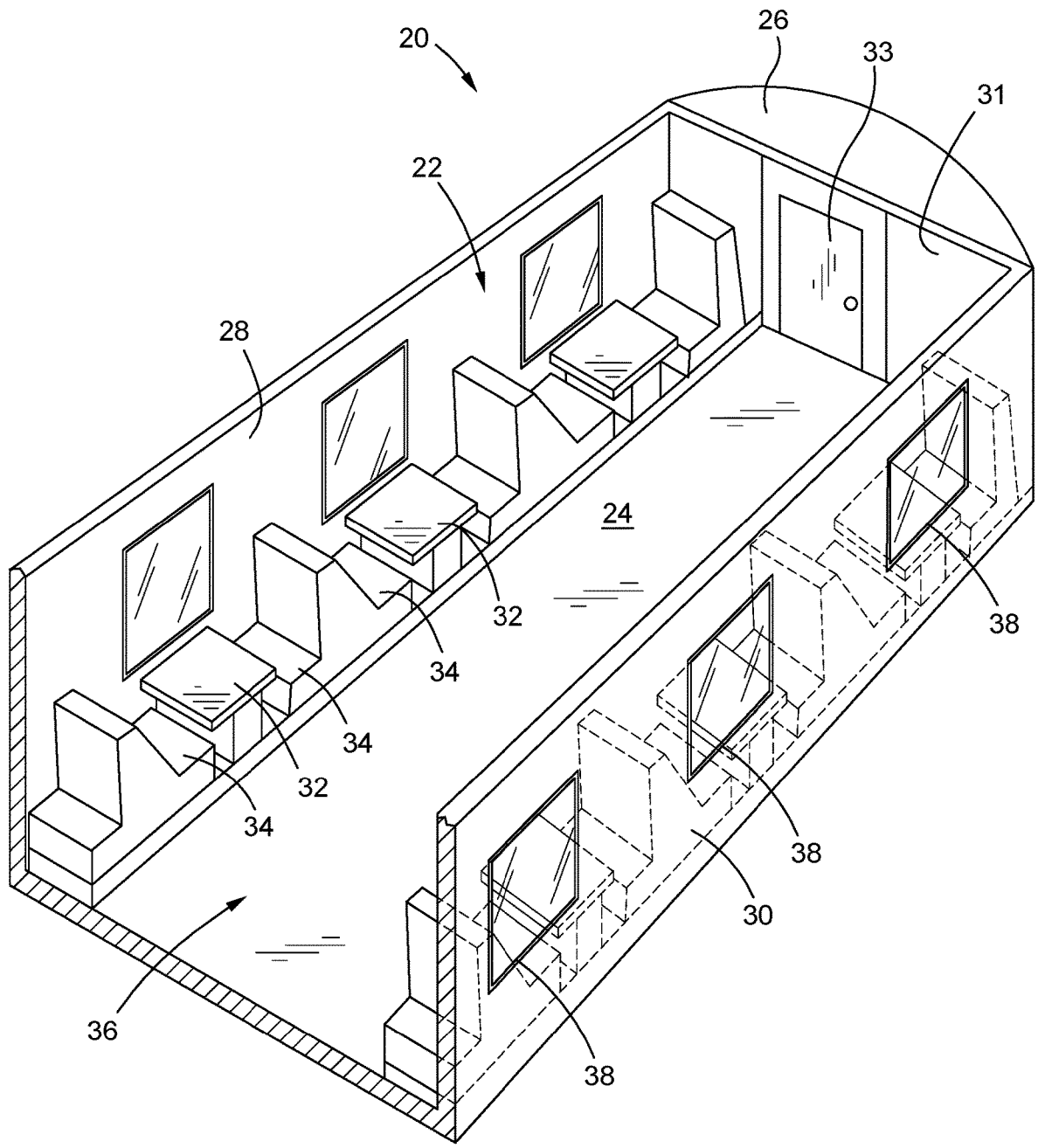
FIG. 1 illustrates a presentation environment for a virtual experience in accordance with the present invention.

One aspect of the invention comprises a physical environment for the virtual experience. In one embodiment, as illustrated in FIG. 1, the environment comprises a viewing or user environment 20. The environment 20 could comprise a dining or lounge environment, including where the environment has a particular theme, such as associated with a mode of travel (rail, bus, ship, aircraft, etc.), a geographic location, culture, etc.

Referring to FIG. 1, the environment 20 comprises an interior space or compartment 22 defined by a structure, which structure preferably comprises or defines a floor 24, an opposing ceiling 26, a first sidewall 28 and an opposing second sidewall 30, and a first end wall 31 and a second end wall (not shown). The environment 20 might be a freestanding space or might be created in another space, such as within a restaurant space, a convention or mall space or the like. In such a configuration, the sides and walls might be constructed, such as from wall panels, studs and sheathing, etc.

The dimensions of the interior space 22 may vary, such as depending upon the location and desired functionality (including how many customers are to be seated/served), etc., and might have dimensions which are chosen to emulate a vehicle environment (such as the interior of an actual rail dining car).

Figure 6:
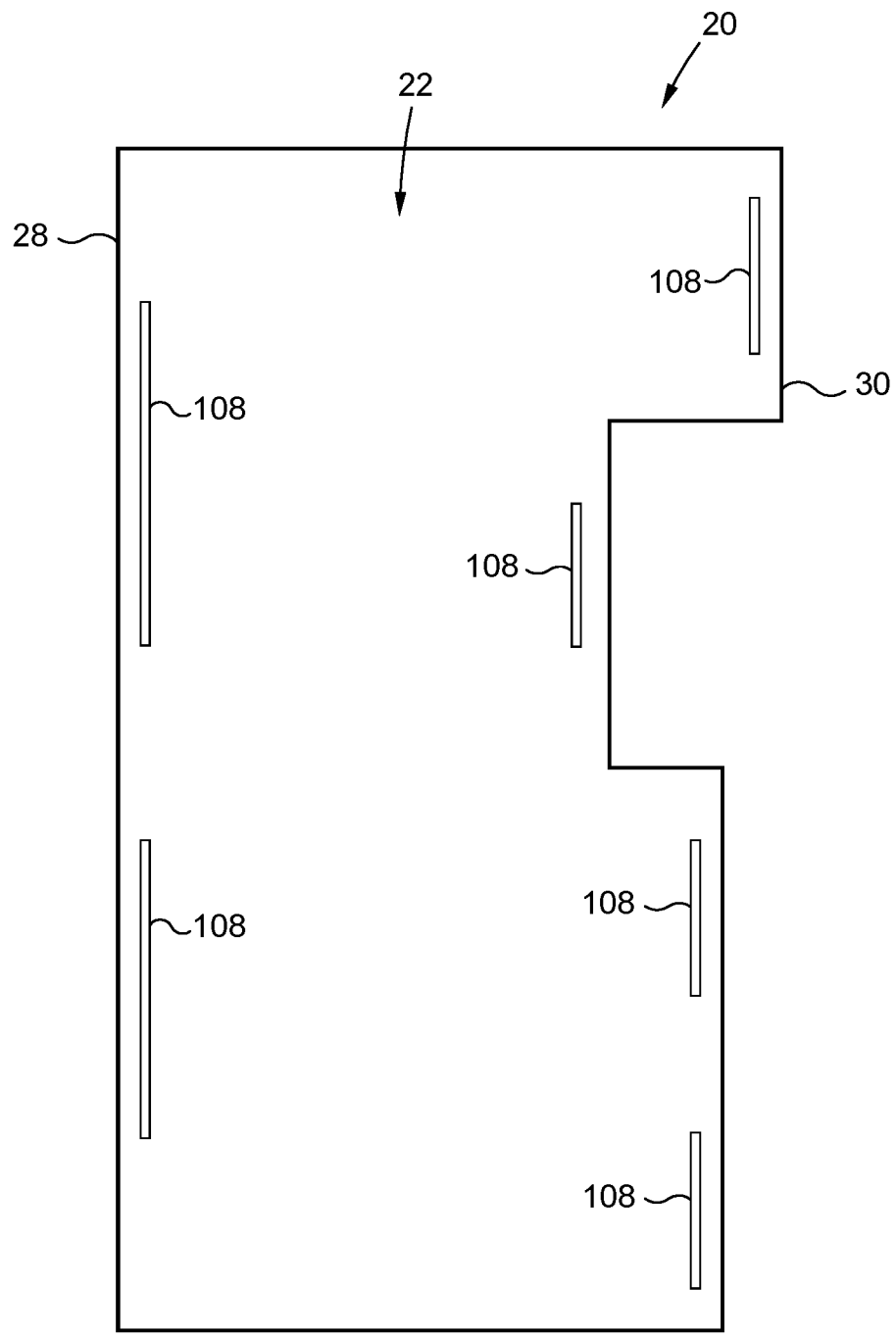
FIG. 6 illustrates another configuration of an environment for a virtual experience in accordance with the present invention.

The interior space 22 of the environment 20 may be configured or appointed with features which are associated with a particular journey (such as the location of the journey) or a particular mode of transport. For example, in the case where a railway journey is being simulated, the interior walls, lights, flooring and the like, may all be constructed to be similar to those found in a real railcar, such as a dining or lounge railcar (including, if desired, matching the décor of a particular railcar era, such as the 20s, 50s or 2000's). As one example, as illustrated in FIG. 1, the interior space 22 might be configured to emulate a dining railcar. In this configuration, a first row of dining tables 32 and associated seats 34 are located between a generally central aisle 36 and the first sidewall 28. A second row of dining tables 32 and associated seats 34 are located between the aisle 36 and the second sidewall 30. However, as illustrated in FIG. 6, the interior space 22 might have various dimensions and shapes (including where the opposing sides of the space are not flat, parallel or the like), and the interior might be appointed in other manners, such as with lounge chairs and table, couches or other elements. For example, the virtual experience of the invention might be implemented at an existing restaurant which comprises an irregularly shaped space or has a shape or dimensions which are not similar to a railcar, aircraft or the like (which shapes heighten the realism of the experience, but may be impractical or costly to build and may not be sufficiently functional, such as when considering serving food and beverage to a large number of customers).

As illustrated, a plurality of virtual windows 38 are located in or at both the first sidewall 28 and the second sidewall 30. As detailed below, these virtual windows 38 preferably comprise video displays which are arranged to face or display inwardly towards the interior space 22. The virtual displays may be of various sizes. As illustrated in FIG. 1, when the environment 20 simulates a railway dining or lounge car, the tables 34 and seats 36 may be aligned or arranged relative to the virtual windows 38. For example, as illustrated, the tables 32 may be aligned with the virtual windows 38. In situations where tables are not provided, the seats 36 may be arranged around and face the virtual windows 38. The number of virtual windows 38 may vary, such as depending upon the length of the environment 20. In one embodiment, the virtual windows 38 in each sidewall 28,30 may be aligned with one another. However, in other embodiments, they may be offset. For example, FIG. 6 illustrates an arrangement of an environment 20 which has opposing walls, but where the number of virtual windows 38, and their size and location, may vary.

In one embodiment, means for ingress and egress to the interior space 22 are provided. For example, a door 33 may be provided in each end wall, such as aligned with an aisle 36. In one embodiment, the door 33 at one end of the environment 20 might be utilized as an entrance and exit for passengers, while a door (not shown) at the other end of the environment 20 might be used by servers, such as by connecting to a kitchen, bar or the like.

Of course, the environment 20 might have other configurations and variations. As indicated, the environment 20 might comprise an existing structure or environment (such as an existing lounge or restaurant), or might be built or located within an existing structure, such as a large party room of an existing restaurant facility, banquet hall, convention space or the like. In one configuration, the environment 20 may be arranged so that customers do not see the exterior of the environment. However, in other locations, passengers might see the exterior. In that event, the environment 20 might include exterior features that cause the environment 20 to have a particular appearance (e.g. such as to appear as a railcar, including being located on wheels, etc.)

As another example, the interior space 22 might be raised, to simulate the elevation of the body of a railcar above the rails and wheels as in the case of a real railcar. In such an event, stairs may be provided at the exterior of the environment 20 which must be climbed to reach the door(s) 33. As another example, a walkway which simulates an airline boarding walkway might be provided through which customers enter the interior space 22, such as when an airline journey is being simulated.

As indicated, the interior space 22 might include a number of features, including ornamentation or décor elements. For example, if the interior space 22 is to be used as a lounge, the space 22 may include seating (chairs, couches, etc.), tables, lamps and the like. If the interior space 22 is to be used for dining, it may include bus stations, tables and chairs and the like.

The ornamentation/décor or other elements of the space 22 may be selected to heighten the virtual journey experience. For example, if the virtual experience is that of a railway trip in Japan, the décor may be Asian-themed, and dining tables might include chopsticks and similar features, and when food and/or drink are served, the menu and/or the food/drink might be Asian/Japan themed.

Virtual Content

As described below, in order to simulate a journey experience, video content is displayed on the displays that comprise the virtual windows 38. The video content comprises content of a journey or excursion (e.g. involving movement of a user relative to an environment). For example, in one embodiment, the content comprises video of one or more railway journeys—e.g. video captured from an actual train. However, the journey or excursion might be content comprising video of a bus trip, motorcycle trip, cruise, air flight (by plane, dirigible or otherwise), or even a walking tour (such as through a museum, castle, garden or the like).

In one embodiment, the environment 20 is not configured to move. One problem with video captured from moving objects is that the motion of the object influences the video footage. This motion may include "bouncing" or other vertical motion. Optical movement in the field of vision of a viewer without any physical equivalent (such as without the environment moving) can be very disturbing to the viewer, particularly to a view who is eating.

Another problem is associated with objects which are located close to the viewer of the footage. Such "close" objects interfere with the virtual presentation due to the two-dimensionality of the video displays and the different perspective of the viewer to the different video displays. In the case of a railway journey, such objects might comprise, for example, rail stations, houses and buildings which are located very close to the train.

In accordance with the invention, video content is captured using cameras, and preferably high definition cameras. The cameras may be digital cameras which are capable of capturing video at 8K resolution or greater, preferably at 50 fps or higher frame rates.

In one embodiment, cameras are located at or on opposite sides of an actual moving object (or configured to capture images from generally opposing sides of the object). Such an object may comprise a vehicle or other mode of transport, a person, etc. For example, cameras may be located on each side of a real train and simultaneously/synchronously capture video as the train moves. Of course, cameras might be configured to capture images at opposing sides of any moving object (whether such is a person, ship, car, bus, aircraft, etc.). In one embodiment, the one or more cameras capture images in generally opposing directions. Video captured in this manner, when presented via displays which generally oppose one another in a space, create a realistic impression of movement to the viewers.

In order to overcome the problems noted above, image stabilization (including either or both physical shake stabilizers or dampers and digital image stabilizers) is utilized. In addition, video footage may be limited to areas where the object is travelling in open spaces (for example, not in urban areas where the train may be travelling between closely located buildings and the like). Further wide angle lenses are avoided to ensure that the captured images are as distortion-free as possible.

Preferably, audio information is also captured. The audio might be captured using a sound capture device which is associated with the camera, such as an associated microphone. Alternatively, separate audio capture devices might be utilized. The captured audio may be stored as part of a combined audio/video file or as one or more separate audio files from the video files.

In other embodiments, other audio may be presented with the video content, such as music, narrative (including narrative over actual captured sound), etc.

As indicated, images might be captured from a variety of objects, including in a variety of locations. For example, different railway journeys might be captured, thus enabling the presentation of various virtual rail experiences to viewers/passengers. Such experiences might comprise various of the great railway journeys of the world, such as the Bernina Express, Train to the Clouds, Danube Express and other routes.

Preferably, the captured content (video or video and audio) is stored, such as on one or more data storage devices. The content may then be edited and the like, for later presentation by a content presentation system as detailed below. For example, in one embodiment, content is edited and compiled into a content sequence.

Content Presentation Systems and Methods

Figure 2:
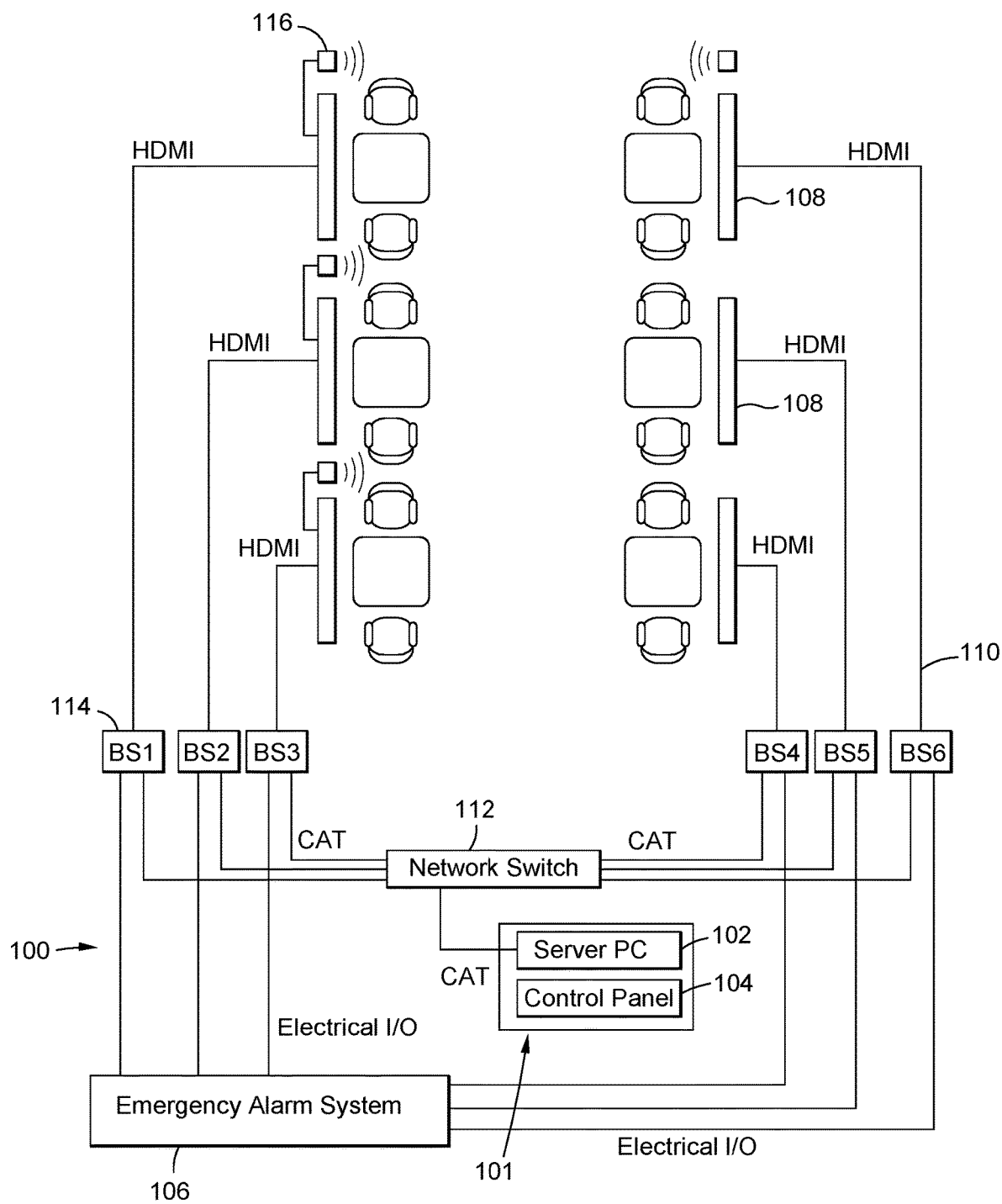
FIGS. 2, 3A, 3B, 4 and 5 each schematically illustrate a content presentation system in accordance with an embodiment of the invention.

FIG. 2 illustrates one embodiment of a content presentation system 100. As illustrated, the system 100 may comprise a master unit 101, an emergency system 106, a plurality of video displays 108 which comprise the virtual windows 38 of the environment 20, one or more communication links 110, communication devices 112, and media controllers 114. In embodiment, the master unit 101 comprises content server 102 a control panel 104.

The content server 102 may comprise a computing device, such as a server, workstation or the like, having a processor, a memory for storing machine-readable code which is executable by the processor (e.g. "software"), one or more communication interfaces for receiving and/or transmitting data, and various user interface devices or elements. Such interface devices might comprise one or more of a keyboard, mouse, touch-screen, video display, etc.

In one embodiment, video content is stored in one or more data storage devices which are associated with the content server 102. Such devices might comprise, for example, mass storage devices such as solid state hard drives or other devices for electronically storing data.

The control panel 104 may comprise a user interface which communicates with the content server 102 and may communicate with other elements of the system 100, such as the media controllers 114. The control panel 104 might comprise, for example, a processor or controller, software stored in a memory and executable by the controller, various information presentation devices such as a display, user input devices such as a keyboard, mouse and/or touch-screen, etc., or specialized input devices such as switches, sliders, etc. the control panel 104 might comprise a specialized device or control unit, having a unique arrangement of physical elements and may comprise a separate device from the content server 102. In other embodiments, the control panel 104 might be integrated with the content server 102.

The media controllers 114 are preferably configured to receive information from the master unit 101, such as the content server 102, such as in the form of files. In one embodiment, the data is transmitted using a TCP/IP protocol. The media controllers 114 are configured to convert the video and, if included, audio files from TCP/IP data into an HDMI feed which is output to the displays 108. Such a media controller 114 might comprise, for example, a Pandora's Box from Christie Digital, a Pixera controller by AV Stumpfl, a Vertex controller from iOversal, or media controllers from Disguise, Hippotizer, Scala and/or BrightSign.

Various components of the system 100 may communicate via one or more communication links 110 and interfaces. Such communication links 110 might comprise wired links, as well as devices such as network switches 112 and other devices. In one embodiment, the communication links between the content server 102, the network switch 112, the control panel 104 and the media controllers 114 comprise Cat 5/5e wired links. The media controllers 114 then preferably communicate an HDMI audio/video feed over HDMI cables to the video displays 108.

In this example, the system 100 is decentralized, wherein modular content feeds are utilized via multiple synchronized media controllers.

The video displays 108 (which comprise the virtual windows 38 as illustrated in FIG. 1) may comprise various types of image display devices. For example, the video displays 108 may comprise generally flat panel video displays such as LCD, LED, plasma, OLED or other types of displays, or might comprise projection type displays such as digital light projection (DLP) devices. As indicated, in a preferred embodiment, a plurality of (two or more) first video displays 108 are preferably located at a first side of the environment 20 and a second plurality (two or more) second video displays 108 are located at a second side of the environment 20. The plurality of first and second video displays are preferably spaced from one another (as indicated above, such as to simulate windows of a train car, airplane, ship, vehicle, etc.). The number of first video displays and second video displays 108 may vary, as may their size and shape. For example, as illustrated in FIG. 6, the size and number of video displays located at opposing sides of the environment 20 may vary.

In this embodiment, compiled video sequences are played back decentralized via the media controllers 114. Video files are transmitted to the media controllers 114 for processing. The master unit 101 may control the network switch 112 to synchronize the media controllers 114, such as via TCP/IP commands. In particular, in one embodiment, the master unit 101 causes the distribution of an offset signal to each of the media controllers 114, along with a start time. When a start time is sent, the media controllers 114 follow that start time command, causing all video files to be played back (e.g. by output of the video files as HDMI video signals which are displayed vi the displays 108), simultaneously, but subject to the designated offset.

The designated offset for each media controller 114 will depend upon the location of the display 108 that the media controller 114 is controlling or providing content to. In one embodiment, the designated offset is a period of time that depends upon the linear distance between each display. As one example, the designated offset may be in the range of 50 ms when the displays 108 are spaced apart by 1-2 m. Of course, the offset between displays 108 may be larger or smaller depending upon the spacing between displays, wherein the designated time offset may vary between different pairs or sets of displays.

In general, a fundamental design feature of this embodiment is the accuracy of the synchronization of the video content presented on each display of the linear (and spaced) arrangement of displays 108, whereby to the observer the images presented via the displays 108 are perfectly timed and give the illusion of a continuous video image without artifacts.

As indicated, in a preferred embodiment, not only is video presented by the displays 108, but preferably associated audio is presented to the passengers. In one embodiment, the audio files are also transferred from the master unit 101, such as the content server 102, to the media controllers 114 for processing and presentation. In one embodiment, the audio content may be integrated with the video content, such as into a combined HDMI signal. The displays 108 or separate decoders preferably de-embed the digital audio from the HDMI signal for presentation via one or more audio presentation devices, such as speakers 116. It is noted that speakers 116 might be placed in various locations throughout the railcar environment 20, depending upon the desired effects.

Of course, other types of audio systems may be utilized. Such systems may include speakers of various configurations, including for presenting sounds at different frequencies, may include cross-overs and other features. In one embodiment, individual speakers or groups of speakers might be configured to present a single or main audio track. Alternatively, different audio tracks may be provided to different of the media controllers 114, thus causing different speakers to present different audio.

The control panel 104 may allow centralized file management, file updates, scene selection, playback sequence, system control, switching on and off, volume settings, etc. These control features may be enabled by content management software which is associated with the control panel 104 and/or the content server 102.

In one embodiment, the system 100 may include other features, such as interior lighting, heating and/or air conditioning, fragrance diffusers and other features. Such devices or elements may also be controlled via the system 100, such as via the control panel 104, via commands issued from the control panel 104 to controllers associated with those devices. For example, a particular video sequence may include a portion of a train ride during the day and into the evening. The control panel 104 may cause commands to be issued to lights within the railcar environment 20 to be at a high level of brightness during presentation of the portion of the video during the day, and as the evening portion is presented, to cause the lights to dim to lower levels, corresponding to the lower brightness of the presented images.

In one embodiment, an emergency shutdown sequence can be started via an electrical I/O interface on the media controllers 114, such as in the event of a default. In other embodiments, an emergency sequence might be initiated in other manners, such as via input to the control panel 104. Such an emergency shutdown sequence may cause the presented content to be stopped or switched off (at one or more or all of the displays 108 and/or audio devices 116). In one embodiment, the shutdown sequence might cause a special emergency sequence to be played—including lighting changes and visual notifications. For example, via a shutdown input to the control panel 104, the master unit 101 might cause the media controllers 114 to present emergency notification information via their associated displays 108 and/or audio devices 116 (such as via stored files or files/data transmitted from the content server 102 to the media controllers 114).

This embodiment system 100 may be referred to as a decentralized, modular content delivery system via multiple synchronized media controllers. One advantage to this embodiment of the invention is that the system 100 is scalable. In particular, video displays 108 can be added by simply adding an associated media controller 114 and then programming the extra media controller 114 (and designated time offset) into the master unit 101.

Figure 3A:
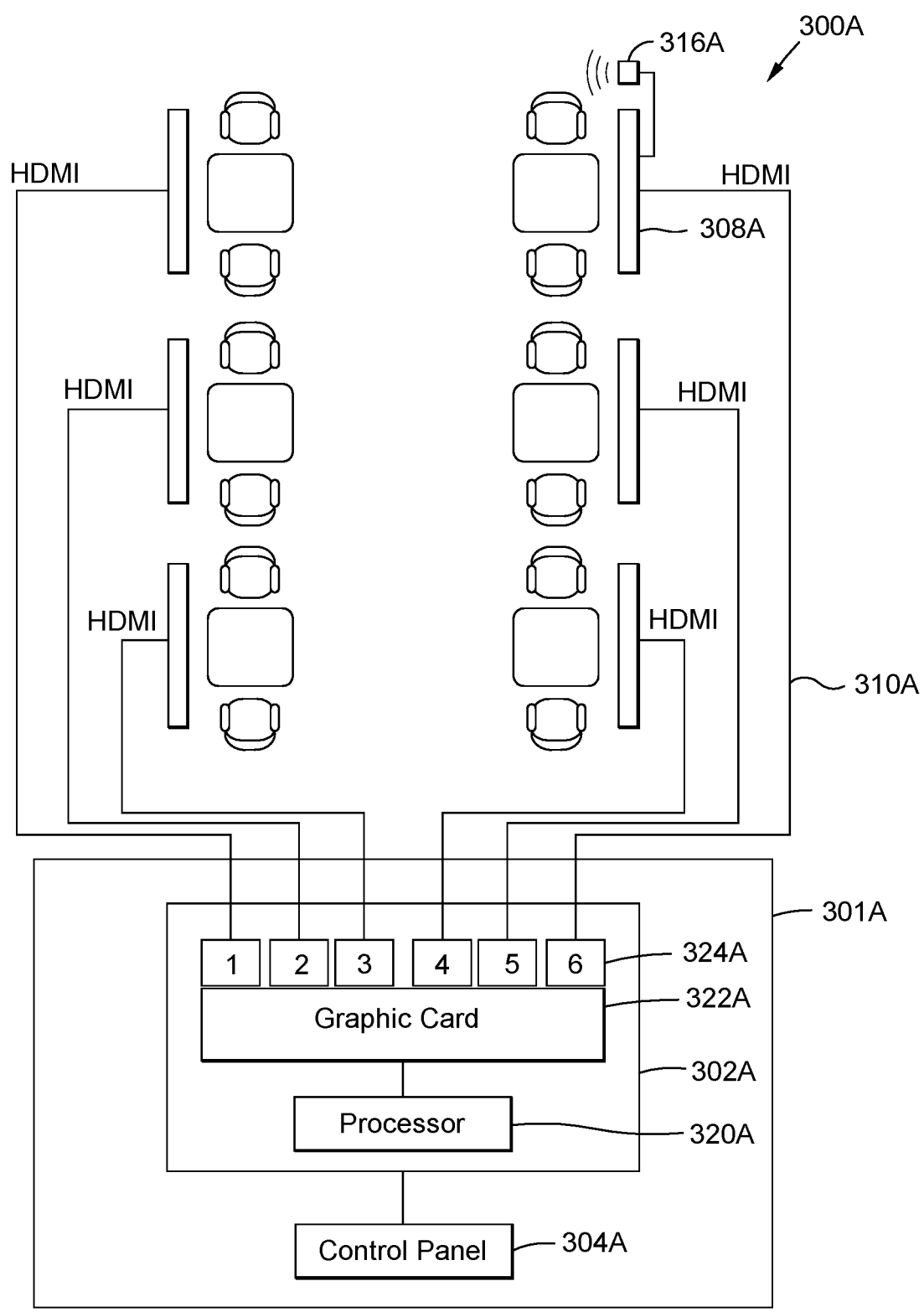

FIG. 3A illustrates another embodiment of a content presentation system 300A.

This embodiment system 300A may again comprise a master control unit 301A, such as comprising a content server 302A and a control panel 304A. The master control unit 301A is configured to provide an output to the one or more video displays 308A (and preferably audio presentation devices 316A), such as by one or more communication links 310A. Details of examples of these components are described above.

In this embodiment system 300A, content sequences may be created as a complete film or in individual parts in a timeline-based media control software on the central content server 302A. In this embodiment, the content server 302A may comprise a main processor 320A (with associated memory) which provides an output to at least one graphics card 322A having at least two (and preferably four or more) outputs 324A, or uses multiple synchronized graphics cards with one or more outputs. Preferably, the number of graphics cards 322A is chosen so that a unique output 324A is provided for each display 308A. In this manner, the content server 302A can generate and directly provide content to each display 308A (and each audio generation device 316A). Such graphics cards 322A might comprise, for example, a Quadro or GeForce card from NVIDIA or a Radeon card from AMD.

In this configuration, the entire scene may contain several sequences, compositions and, if necessary, cues. Multiple individual outputs are set up, whereby each output is assigned to a display 308A or "virtual window". Each of those outputs may, all while being centrally synchronized, have its own output resolution, associated audio track and/or other parameters. In this embodiment, the individual outputs may be generated in a manner that creates the desired time offset of the display of content between each display 308A, such as based upon the distance between the displays.

In one embodiment, each output may be assigned a virtual camera or its own display area in a global system (such as via a virtual camera associated with software used to process the captured video content, where the virtual camera(s) can be used to manipulate the content, including portions thereof which may be assigned to the individual outputs).

One again, audio may be presented in various manners. In this embodiment, the audio tracks may be assigned to sound cards for individual channels. Multi-channel sound systems, such as 7.2 channels, can thus be used across the entire interior space or compartment.

As with the prior embodiment, other systems or elements may be part of the system 300A, including in direct integration with the presented content or separately therefrom (e.g., room lighting, heating and air conditioning systems or fragrance diffusers) and might be centrally controlled. Further, the system 300A may again include an emergency shutdown configuration.

This embodiment system 300A may be referred to as a centralized content delivery system having multiple content outputs. An additional advantage is that the individual outputs of the one or more graphics cards are connected directly to the displays (such as via vide cables). Synchronization of several devices is thus not necessary.

Figure 3B:
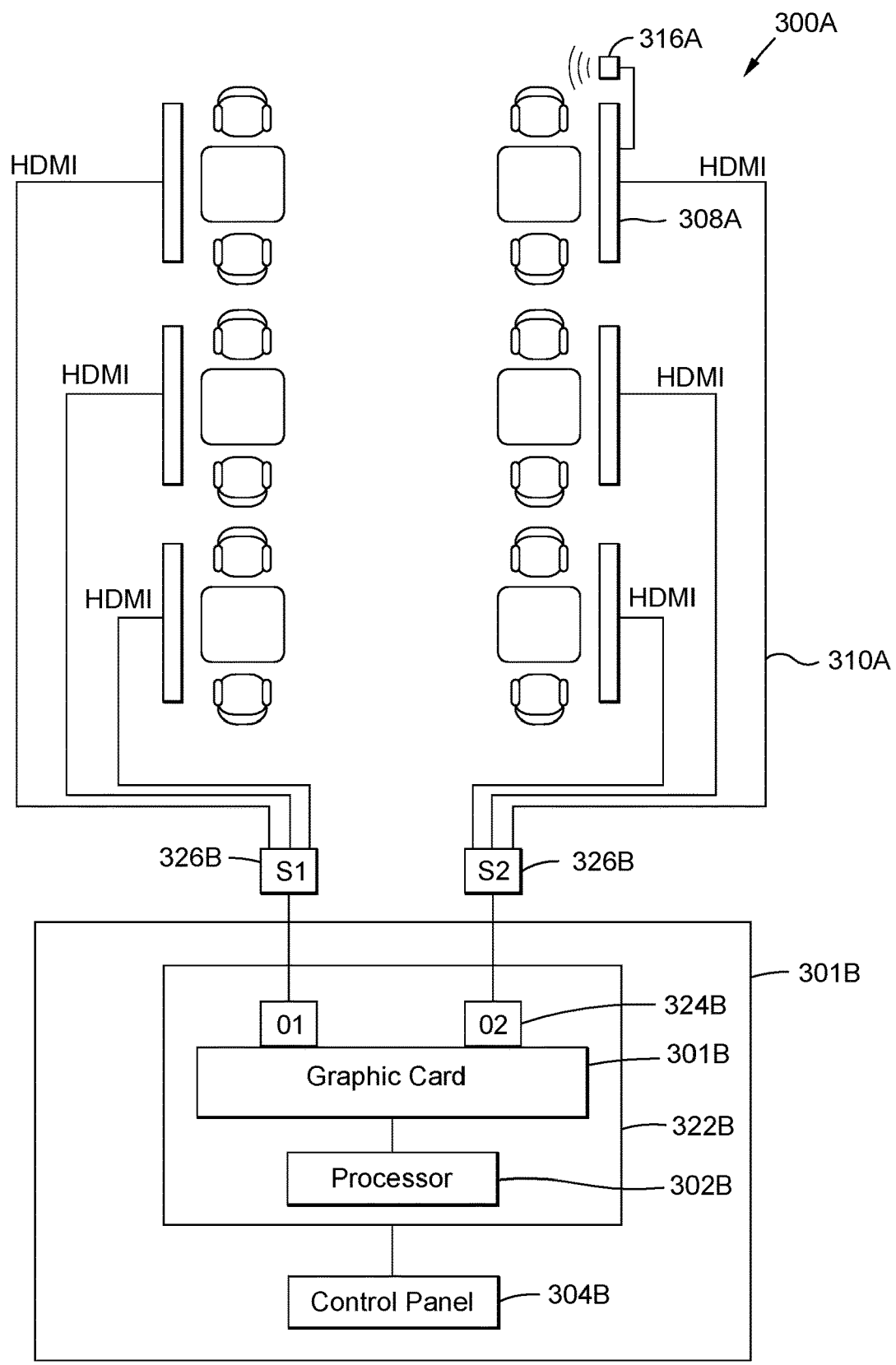

FIG. 3B illustrates another embodiment of a content presentation system 300B. This embodiment content presentation system 300B is similar to the system 300A just described. However, in this variation, the one or more graphics cards 322B have a number of outputs 324B which is fewer in number than the number of displays 308B. As such, the outputs 324B of the graphics cards 322B are connected to one or more video signal split processors 326B. Each split processor 326B splits up the input signal into X output signals (including scaling the output resolution, if necessary). The number of split processors or splitters 326B is chosen so that the number of outputs thereof correspond to the number of displays 308B, wherein a cable or other communication link 310B is used to connect one of the splitter outputs to one of the displays 308B.

This embodiment of the invention may otherwise be similar to the system 300A described above, such as including other features and elements.

This embodiment has the benefit that a complex and expensive graphics card that has a number of outputs equal to the number of displays (which may be difficult in situations where a high number of displays are used, such as 8-12 or more) is not needed. Instead, splitters can be associated with a base graphics card to create the desired number of outputs. And once again, direct output of the content to each display means that the synchronization of several devices is not necessary.

In this configuration, the system essentially combines the outputs for each of the displays (such as where each display has its own media including associated time offset), such as into one HDMI signal). Example of splitters 326B may include the X4 or FX4 display controllers by Datapath and Terenex Mini 12 g-sdi to quad sdi controllers by Black Magic Design.

Figure 4:
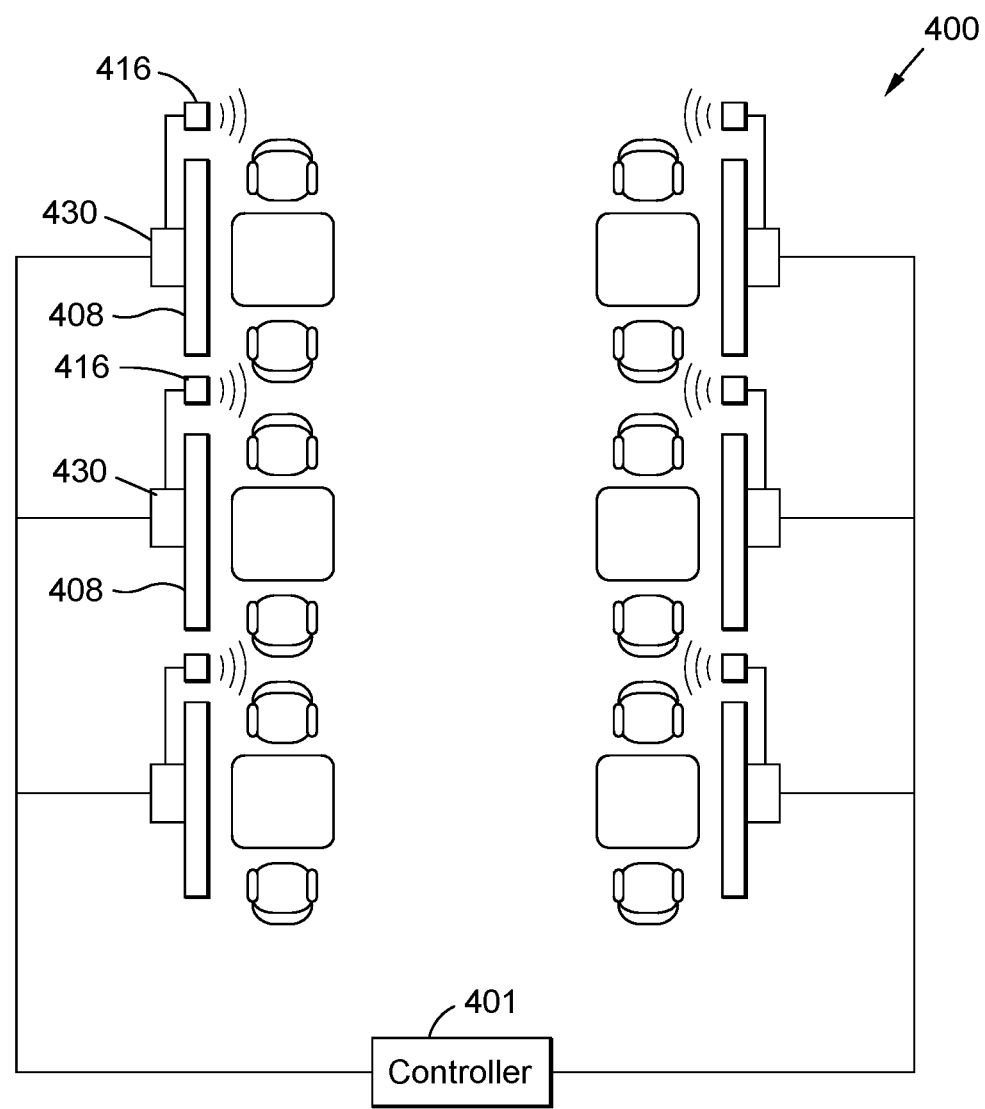

FIG. 4 illustrates another embodiment of a content presentation system 400. In this embodiment, individual displays 408 are equipped with an onboard media player 430. Once again, the content sequences may be created as a complete film or in individual parts. In this embodiment, however, the content may be stored on a portable memory or storage device, such as a portable USB drive (not shown), wherein one such device is provided per display 408.

Each portable data storage device is associated with one of the displays 408 via its associated media player 430 (such as by plugging each one into a USB port of one of the media players 430).

In this embodiment, all of the displays 408 are triggered simultaneously to load the content from the associated portable storage device via their associated media player 430. In one embodiment, the displays 408 might be controlled by a common controller 401, which might be connected to the displays 408 via a wired or wireless communication link (including, for example, an infrared remote controller).

In such a configuration, audio might be presented via audio presentation devices 416 which are associated with the displays 408, e.g. where the media player 430 of the display 408 has one or more audio outputs which are connected to the one or more audio presentation devices 416. In another embodiment, the output of a single one of the media players 430 might be provided to an audio system having one or more audio presentation devices 416.

In this embodiment, each media file may preferably be constructed so that the content has a built-in time delay, and where the time delay depends upon the location of the display 408 that is to present the content in relation to the other displays 408.

Of course, the system 400 might include other features, such as associated systems or features which are controlled by the same controller 401 or other controllers.

Figure 5:
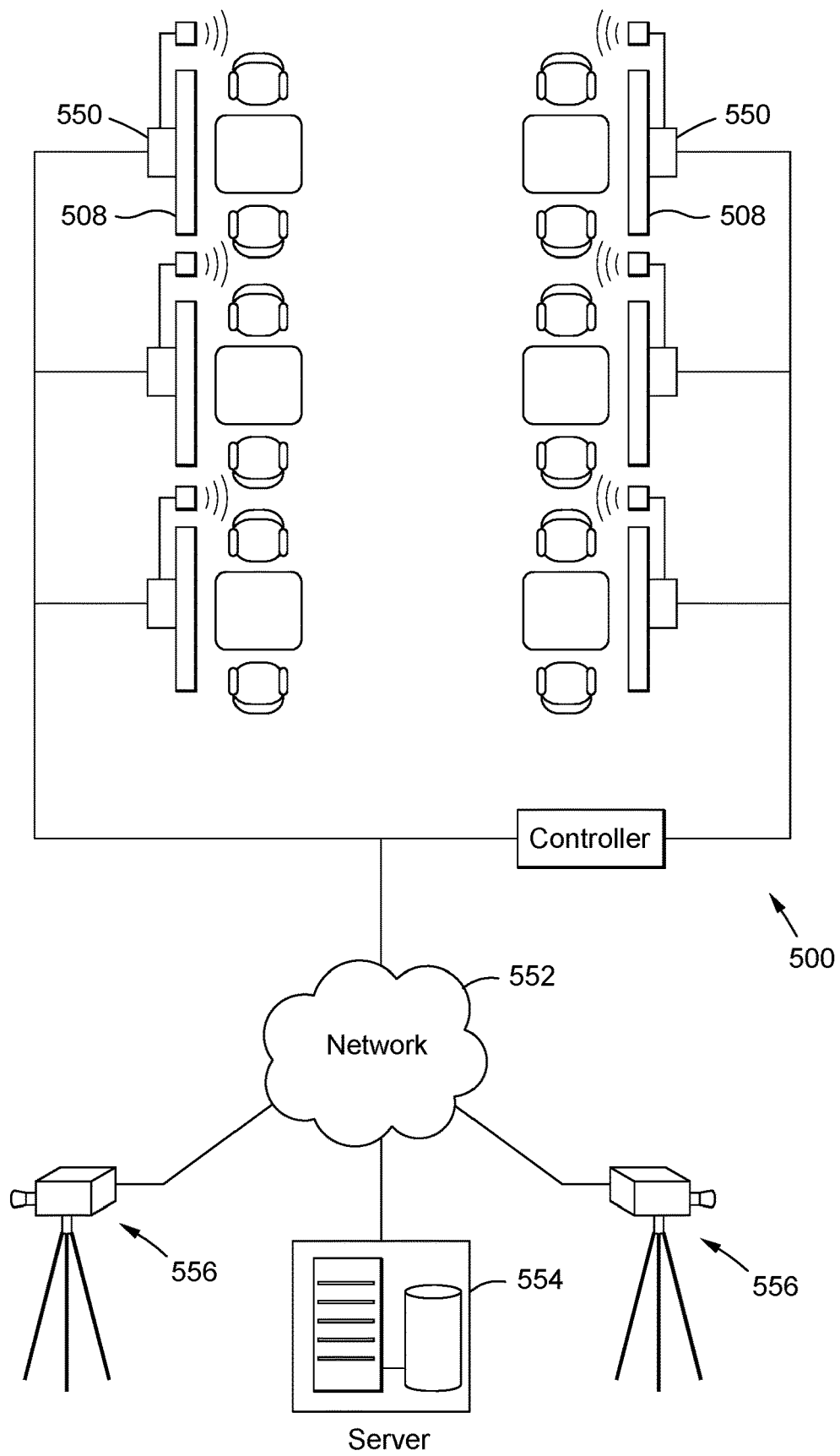

FIG. 5 illustrates another embodiment of a content presentation system 500. In this embodiment, pre-produced media is streamed from a remote location to the system 500. In this embodiment, the content may again be created as a complete film or in individual parts, and is preferably stored on a local network storage or in the cloud for streaming to the system 500, such as in a memory of a remote server 554. In a preferred embodiment, the content is processed with an encoder to optimize it for streaming transmission, such as an encoder which implements the H.264 standard.

In one embodiment, content is presented via a streaming decoder 550. In one embodiment, each display 508 is equipped with an onboard streaming decoder. Such decoders 550 are preferably configured to decode the content in accordance with the coding standard. Such decoders 550 might comprise model SMD 101 or 202 decoders by Extron.

The decoders 550 are communicatively coupled to the media or content source, such as the remote server 550. For example, the decoders 550 may be linked to the remote server 554 via a network 552 such as dedicated or public network, or combinations thereof, wherein one or more of the network links may comprise wired and/or wireless links. In one embodiment, the network may include or comprise the Internet. In such an embodiment, the coded content may be transmitted using a data transmission protocol such as TCP/IP.

In this embodiment, all decoders 550 are triggered simultaneously, such as via a central or common controller, to load and playback the media file through the network 552. In such a configuration, each decoder 550 (or an associated controller associated with the decoder) may request the content from the server 550. The server 550 then transmits a copy of the content to each of the decoders 550 for decoding and then presentation via its associated display.

Of course, the system 500 might include other features, such as associated systems or features which are controlled by the same central controller or other controllers.

In a variation of the system 500 illustrated in FIG. 5, the system 500 includes one or more external streaming decoders 550 (e.g. decoders which are not part of each display 508, but may be remote therefrom). The operation of this system 500 is similar to that described above, wherein all decoders 550 are triggered simultaneously to load and playback the media file through the network 552. However, in this case the output of each decoder 550 is routed to one of the displays 508, such as via a cable. For example, each decoder 550 might be configured to output a high-definition video signal over an HDMI output to an HDMI cable that connects to an HDMI input of the display. In this configuration, each decoder 550 (and thus each display 508) gets it own feed (e.g. a single feed per display 508, where the feeds may be unicasted), so that each display may present its own feed in a time-synced (e.g., as necessary, time offset) manner.

In the embodiments described above relative to FIG. 5, the content (video or video and audio) may be prepared and stored as a media file for later retrieval and processing by a decoder and then presentation via the associated displays. In another embodiment, however, the media might be live-streamed to the decoders (whether the decoders are onboard the displays 508 or remote therefrom). For example, the content may be captured live (video or video and audio) such as via one or more cameras 554, coded (such as via one or more coders) and then live-streamed (such as by transmitting the encoded content via TCP/IP over the Internet), to the decoders 550.

In this embodiment, the decoders 550 might again be simultaneously triggered to access the feed and begin processing and displaying the content/feed.

In this embodiment, a camera may capture content which is provided to a single display—e.g. a camera is provided for each display, whereby each display is provided with a unique feed of content. The cameras may be positioned relative to one another in a similar manner as the displays, whereby each display is provided with a feed which corresponds temporally to the content in relation to the position of the display to the other displays.

In one embodiment, curtains may be associated with the video displays. The curtains may be closed when the viewers or customers enter the environment. When the virtual journey begins, the curtains may be opened (such as automatically using the system described above). The curtains might be opened at a time when the video displays are displaying static video content (such as video captured from a train sitting in a station before it begins moving, etc.), or might be opened at a time when the video displays are already displaying moving video content. In another embodiment, the video content might be edited to include virtual curtains. The virtual curtains might be displayed by the video displays until the actual video content of the journey begins to be displayed by the displays.

One embodiment of the invention is a system which includes a viewing environment, including a content presentation system, such as a video or video and audio presentation system as described herein. Other embodiments of the invention comprise just a content presentation system, such as which may be sold and/or installed in an environment. Additional aspects of the invention comprise methods of capturing and presenting content. In some embodiments, content (video or video and audio) may be captured as described herein. The content may then be transmitted to or accessed by operators of systems of the invention at remote locations. For example, a content provider may capture the content and prepare it for presentation. This content may be stored on a server. Remote system operators may access the content, such as on a subscription bases and download the content for presentation as described herein.

The invention has numerous beneficial features and solves various problems. The invention advantageously realistically creates a virtual journey experience, e.g. the perception of traveling through an environment, such as via an actual mode of transport or movement. First, the experience is realistic because it involves the presentation of actual content obtained from the object moving through the environment. Second, the experience is realistic because of the manner by which the content is presented to the viewer—including via multiple spaced-apart displays at opposing sides of a virtual viewing environment, whereby the viewer perceives not only movement via the content displayed via multiple displays at one side of the environment, but because the content is displayed at opposing sides, thus enhancing the "immersion" of the viewer in three dimensional space.

One benefit of the invention is that the same system can be used to present different content. For example, a restaurant might be configured with a system of the invention. The restaurant might present a railway journey one night and a cruise or airflight journey another night. In other words, the same environment can be used to present any number of different types of journeys to the viewers.

Another advantage of the invention is that various existing environments may be modified to include features of the invention. For example, an existing restaurant may be modified by installing video displays on opposing walls thereof and by providing the video content delivery components for delivering captured video content to the video displays, whereby the existing restaurant is transformed into a virtual journey environment.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A system for creating a virtual moving-journey experience for occupants of a non-moving structure comprising:
    a structure having at least a first side and a second side and an interior space therebetween in which said occupants are located;
    a first and second video displays located at said first side of said interior space facing into said interior space so as to be viewable from said interior space, said first and second video displays spaced apart from one another by a first distance;
    a third and fourth video displays located at said second side of said interior space and facing into said interior space to as to be viewable from said interior space, said third and fourth video displays spaced apart from one another by a second distance; and
    a video content presentation system comprising:
        a first media player configured to cause said first video display to present a first video content, said first video content comprising content captured by one or more cameras from a first side of a moving object and stored for later presentation relative to said non-moving structure, said first video content customized to the output resolution of said first video display;
        a second media player configured to cause said second video display to present a second video content, said second video content comprising said content captured by said one or more cameras from said first side of the moving object, said second video content customized to the output resolution of said second video display and offset by a first time corresponding to the first distance from said first video display to said second video display;

a third media player configured to cause said third video display to present a third video content, said third video content comprising content captured by one or more cameras from a second side of said moving object and stored for later presentation relative to said non-moving structure, said third video content customized to the output resolution of said third video display;

a fourth media player configured to cause said fourth video display to present a fourth video content, said fourth video content comprising said content captured by said one or more cameras from said second side of said moving object, said fourth video content customized to the output resolution of said fourth video display and offset by a second time corresponding to the second distance from said third video display to said fourth video display; and a media controller configured to synchronize the presentation of said first, second, third, and fourth video content.

2. The system in accordance with claim 1, wherein said interior space has features of a train, said features comprising one or more of tables, wall décor, flooring, and railcar lighting features.

3. The system in accordance with claim 1, wherein said first, second, third, and fourth video displays are located in said first and second sides of said structure in locations corresponding to the location of windows of a mode of transportation.

4. The system in accordance with claim 1, wherein said first, second, third, and fourth video contents are retrieved from a content storage device connected to said first, second, third, and fourth media players.

5. The system in accordance with claim 1, wherein said video content presentation system comprises a content decoder corresponding to said first, second, third, and fourth video displays, each content decoder providing a video output to one of said first, second, third, and fourth video displays from a streaming video content source.

6. The system in accordance with claim 5, wherein said streaming video content source comprises a remote content server.

7. The system in accordance with claim 5, wherein said streaming video content source comprises said one or more cameras.

8. The system in accordance with claim 1, further comprising one or more of the following: an audio content presentation system, an environmental system comprising at least one of a lighting control system, an HVAC control system, and a fragrance system.

9. The system in accordance with claim 1, wherein said first, second, third, and fourth media players are remote to said first, second, third, and fourth video display.

10. The system in accordance with claim 1, wherein said media controller is configured to synchronize said presentation by sending synchronization information to said first, second, third, and fourth media players, said synchronization information comprising a start time and an offset time.

11. The system in accordance with claim 1, wherein said offset of said first time is associated with a media file corresponding to said second video content and said offset of said second time is associated with a media file corresponding to said third video content.

12. The system in accordance with claim 1, wherein said first, second, third, and fourth video content are loaded from a media storage associated with said first, second, second, and fourth media player.

13. The system in accordance with claim 1, wherein said first, second, third, and fourth video content are transmitted to said first, second, second, and fourth media player as one or more files.

14. A method of creating a virtual journey experience, comprising:
providing a virtual user environment, comprising:
a structure having at least a first side and a second side and an interior space therebetween;
a first and second video displays located at said first side of said interior space facing into said interior space so as to be viewable from said interior space, said first and second video displays spaced apart from one another;
a third and fourth video displays located at said second side of said interior space and facing into said interior space to as to be viewable from said interior space, said third and fourth video displays spaced apart from one another; and
a video content presentation system;
causing, by a first media player, said first video display to present a first video content captured by one or more cameras from a first side of a moving object; said first video content customized to the output resolution of said first video display;
causing, by a second media player, said second video display to present a second video content captured by said one or more cameras from said first side of the moving object, said second video content customized to the output resolution of said second video display and offset by a first time corresponding to the distance from said first video display to said second video display;
causing, by a third media player, said third video display to present a third video captured by one or more cameras from a second side of said moving object, said third video content customized to the output resolution of said third video display; causing, by a fourth media player, said fourth video display to present a fourth video content captured by said one or more cameras from said second side of said moving object, said fourth video content customized to the output resolution of said fourth video display and offset by a second time corresponding to the distance from said third video display to said fourth video display; and
synchronizing, by a media controller, said presentation of said first, second, third, and fourth video content.

15. The method in accordance with claim 14, wherein said journey experience is a railway journey and said moving object comprises a train.

16. The method in accordance with claim 14, wherein said journey experience is a cruise and said moving object comprises a ship.

* * * * *